(12) United States Patent
Peronnin et al.

(10) Patent No.: US 12,169,761 B2
(45) Date of Patent: Dec. 17, 2024

(54) CONTROL SYSTEM FOR A STATE OF A QUANTUM HARMONIC OSCILLATOR

(71) Applicants: UNIVERSITE CLAUDE BERNARD LYON 1, Villeurbanne (FR); CENTRE NATIONAL DE LA RECHERCHE SCIENTIFIQUE (CNRS), Paris (FR); ECOLE NORMALE SUPERIEURE DE LYON, Lyons (FR)

(72) Inventors: Théau Peronnin, Paris (FR); Benjamin Huard, Lyons (FR); Sébastien Jezouin, Paris (FR); Antoine Marquet, Lyons (FR)

(73) Assignees: UNIVERSITE CLAUDE BERNARD LYON 1, Villeurbanne (FR); CENTRE NATIONAL DE LA RECHERCHE SCIENTIFIQUE (CNRS), Paris (FR); ECOLE NORMALE SUPERIEURE DE LYON, Lyons (FR)

( * ) Notice: Subject to any disclaimer, the term of this patent is extended or adjusted under 35 U.S.C. 154(b) by 0 days.

(21) Appl. No.: 18/268,238

(22) PCT Filed: Dec. 16, 2021

(86) PCT No.: PCT/FR2021/052371
§ 371 (c)(1),
(2) Date: Jun. 18, 2023

(87) PCT Pub. No.: WO2022/129807
PCT Pub. Date: Jun. 23, 2022

(65) Prior Publication Data
US 2024/0054381 A1    Feb. 15, 2024

(30) Foreign Application Priority Data

Dec. 18, 2020  (FR) .................................. 2013755

(51) Int. Cl.
*G06N 10/40* (2022.01)
*G06N 10/70* (2022.01)

(52) U.S. Cl.
CPC ............. *G06N 10/40* (2022.01); *G06N 10/70* (2022.01)

(58) Field of Classification Search
CPC ..................................................... G06N 10/40
(Continued)

(56) References Cited

U.S. PATENT DOCUMENTS

2019/0049495 A1*  2/2019  Ofek ..................... G06F 9/5027

OTHER PUBLICATIONS

PCT International Search Report and Written Opinion, International Application No. PCT/FR2021/052371, dated Apr. 25, 2022, 12 Pages, with English Translation of International Search Report.
(Continued)

*Primary Examiner* — Eric D Lee
(74) *Attorney, Agent, or Firm* — FENWICK & WEST LLP

(57) ABSTRACT

Control system (1) for a state of a quantum harmonic oscillator, comprising: —a harmonic oscillator (3) in a Schrödinger's cat type state, —a stabilisation device (10) with a predetermined parity of a number of bosons of the state, which device is configured to use first and second frequency combs each comprising at least as many rays as a mean number of bosons in the state, and —a multiphonic dissipation device (20) which is suitable for removing at least one pair of bosons simultaneously from the oscillator, the dissipation device being activated only between two successive time peaks of the frequency combs over a time period greater than the inverse of the product of the mean number and the inverse of the characteristic time of the
(Continued)

multiphonic dissipation, a time period separating two activation periods being less than a characteristic loss time of a boson.

7 Claims, 1 Drawing Sheet

(58) Field of Classification Search
USPC .......................................................... 716/132
See application file for complete search history.

(56) References Cited

OTHER PUBLICATIONS

Gertler, Jeffrey M et al. "Protecting a bosonic qubit with autonomous quantum error correction" Nature (London), England, Apr. 20, 2020 (Apr. 20, 2020), pp. 243-248, Retrieved from the Internet:https://arxiv.org/pdf/2004.09322v 1 .pdf.

Guillaud, J., et al. "Repetition Cat Qubits for Fault-Tolerant Quantum Computation," Arxiv.Org, Cornell University Library, 201 Olin Library Cornell University Ithaca, NY 14853, Dec. 18, 2019, 23 Pages.

Lescanne, R. et al. "Exponential suppression of bit-flips in a qubit encoded in an oscillator", arxiv.org, Cornell University Library, 201 Olin Library Cornell University Ithaca, NY 14853, Jul. 30, 2019, 18 Pages.

* cited by examiner

CONTROL SYSTEM FOR A STATE OF A QUANTUM HARMONIC OSCILLATOR

CROSS-REFERENCE TO RELATED APPLICATIONS

This application is the National Stage of International Application No. PCT/FR2021/052371, filed Dec. 16, 2021, which claims the benefit of and priority to France Patent Application No. FR2013755, filed on Dec. 18, 2020, the contents of which are incorporated by reference in their entirety.

FIELD OF THE INVENTION

The invention relates to the processing of quantum information.

It relates in particular to the correction of errors in the coding of information of the bosonic type, that is to say the coding which encodes information in a bosonic system having a dimension, in the sense of the Hilbert space, which is larger than the two states necessary to encode one bit of information. This is for example the correction of errors in protocols where the information coding uses only Schrödinger cat states of a harmonic oscillator, that is to say a superposition of two (or more) coherent states of the harmonic oscillator.

It also relates in particular to the preparation of states whose parity of the number of bosons is given.

STATE OF THE ART

The implementation of a quantum information processing requires implementing error correction protocols allowing correcting the unwanted changes in the state of quantum bits (or qubits) which inevitably occur due to their coupling to the outside world.

All errors that can occur on a qubit which is a state whose general expression is a|0⟩+b|1⟩, are always combinations of a "bit-flip" type error which produces the state a|0⟩+b|1⟩, and a "phase-flip" type error which produces the state a|0⟩−b|1⟩.

In the bosonic type information coding, a bit-flip type error correction method is known using a multi-photon dissipation device (Lescanne, R., Villiers, M., Peronnin, T. et al. Exponential suppression of bit-flips in a qubit encoded in an oscillator. Nat. Phys. 16, 509-513 (2020)). The information is encoded in a Schrödinger's cat type state of a harmonic oscillator and the correction is based on an engineering of the interaction between the harmonic oscillator and its environment. In connection with this correction of the bit-flips, the method allows increasing the characteristic time between two bit-flip errors occurring on the state carrying the information, the increase being exponential depending on the size of the cat, that is to say depending on the mean number of bosons comprised in the harmonic oscillator. However, the characteristic time between two phase-flip type errors, which are not corrected by the multi-photon dissipation, decreases linearly as a function of the size of the cat.

A method is also known for correcting certain errors related to the loss of a boson in a harmonic oscillator using in particular a protocol for maintaining the parity of the number of bosons (GERTLER Jeffrey M. et al. "Protecting a Bosonic Qubit with Autonomous Quantum Error Correction" <https://arxiv.org/abs/2004.09322>). This time, the correction is based on a dispersive coupling of the harmonic oscillator to an auxiliary device for example a transmon. Depending on how a qubit is encoded in the harmonic oscillator, maintaining the parity can be used to stabilise certain error channels of the qubit or to deterministically stabilise a state of the qubit. The lifetime or the purity of the state carrying the information increases linearly as a function of the coupling power between the oscillator and the auxiliary device.

Moreover, a method is known for preparing arbitrary quantum states of the quantum resonator using the dispersive coupling between a qubit and a resonator (FOSEL Thomas et al. "Efficient cavity control with SNAP gates" https://arxiv.org/abs/2004.14256). The protocol uses phase gates conditioned on the number of bosons in the quantum resonator as well as resonance mode shifts.

DISCLOSURE OF THE INVENTION

According to the invention, a control system for a state of the quantum harmonic oscillator is provided, comprising:
  a quantum harmonic oscillator configured to carry encoded information in a Schrödinger's cat type state of the oscillator,
  a stabilisation device for a predetermined parity of a number of bosons of the state, which device is configured to use first and second frequency combs, the first and second frequency combs each including at least as many rays as a mean number of bosons in the Schrödinger's cat type state of the oscillator, and
  a multi-photon dissipation device arranged to remove at least one pair of bosons simultaneously from the oscillator,
  the multi-photon dissipation device being arranged such that it is activated only over activation periods between two successive time peaks of the first and second frequency combs,
  the activation period having a duration which is greater than the inverse of the product of a mean number of bosons in the Schrödinger's cat type state of the oscillator and the inverse of the characteristic time separating the removal of at least one pair of bosons simultaneously from the oscillator by multi-photon dissipation,
  a duration separating two successive activation periods being less than a characteristic loss time of a boson in the harmonic oscillator.

Such a system is advantageously completed by the following different features or steps taken alone or in combination:
  the activation periods are adjusted such that a localisation of the state in a Wigner representation modified during the activation periods of the stabilisation device is restored by the dissipation device;
  a first frequency deviation separating two successive rays of the first frequency comb and a second frequency deviation separating two successive rays of the second comb are greater than the inverse of the characteristic loss time of a boson in the harmonic oscillator;
  a first frequency deviation separating two successive rays of the first frequency comb is equal to twice a second frequency deviation separating two successive rays of the second comb;
  the first and second combs have peaks in the time domain, the peaks of the first comb being time offset relative to the peaks of the second comb;

the quantum harmonic oscillator is a first superconducting microwave resonator, the stabilisation device comprising:
- a transmon,
- a second superconducting microwave resonator having a quality factor which is lower than a quality factor of the first superconducting microwave resonator, and
- an exciter arranged to emit the first and second frequency combs, the multi-photon dissipation device comprising:
- a dissipator such as a third superconducting microwave resonator having a quality factor which is lower than a quality factor of the first superconducting microwave resonator,
- a pump source and
- a coupling circuit arranged to couple the dissipator and the oscillator, the dissipation device being able to be activated when the coupling circuit receives a pump energy from the pump source.

The invention also relates to a method for controlling a state of a quantum harmonic oscillator comprising the following simultaneous steps:
- stabilisation of a predetermined parity of a number of bosons of a Schrödinger's cat type state of the oscillator, the stabilisation comprising a generation of the first and second frequency combs, the first and second frequency combs each including at least as many rays as a mean number of bosons in the Schrödinger's cat type state of the oscillator, and
- multi-photon dissipation so as to remove at least one pair of bosons simultaneously from the oscillator,
- the multi-photon dissipation being activated only over activation periods between two successive time peaks of the first and second frequency combs,
- the activation period having a duration which is greater than the inverse of the product of a mean number of bosons in the Schrödinger's cat type state of the oscillator and the inverse of the characteristic time separating the removal of at least one pair of bosons simultaneously from the oscillator by multi-photon dissipation, a duration separating two successive activation periods being less than a characteristic loss time of a boson in the harmonic oscillator.

DESCRIPTION OF THE FIGURES

Other features and advantages of the invention will emerge from the following description, which is purely illustrative and non-limiting, and must be read in conjunction with the appended drawings in which.

DETAILED DESCRIPTION OF THE INVENTION

Control System for the State of a Quantum Harmonic Oscillator

Figure 1:
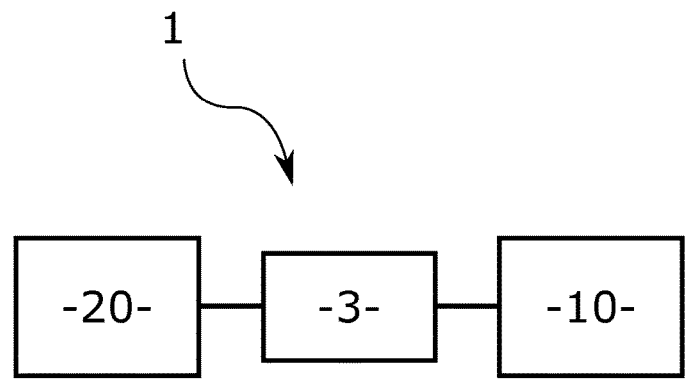
FIGS. 1 and 2 are schematic representations of a control system for a state of the quantum harmonic oscillator according to two embodiments of the invention.

A control system 1 for the state of a quantum harmonic oscillator is schematically represented in FIG. 1.

The system 1 comprises a quantum harmonic oscillator 3, a parity stabilisation device 10 and a multi-photon dissipation device 20.

A quantum harmonic oscillator and a parity stabilisation device have been presented in application FR-2 009 795 to which reference may be made for more details.

Harmonic Oscillator

A harmonic oscillator can be in a state $|k\rangle$, where k is an integer and represents the number of bosons k contained in the oscillator.

The term "harmonic oscillator" can also designate a resonator, the two terms being used interchangeably with the same meaning in this text.

The stabilisation device allows stabilising a predetermined parity of the number of bosons of a quantum harmonic oscillator in an autonomous manner. In particular, a stabilisation of the parity of a two- or four-legged cat state will be sought. The stabilisation of the two-legged cat states allows in particular the preparation of state and the stabilisation of the states of four-legged cat allows in particular the suppression of phase-flip.

The four-legged cat state is defined as the superposition of four coherent states of the quantum harmonic oscillator whose phases differ by a value of $\pi/2$. When a four-legged cat is decomposed on the states $|k\rangle$, the only non-zero coefficients correspond to numbers p of bosons congruent to n modulo 4, where n is a predetermined integer which can be 0, 1, 2 or 3.

Each value of the predetermined integer n defines a four-legged cat. Therefore, there are four four-legged cats.

The four-legged cats, corresponding to the predetermined integer n equal to 0 or to 2, can allow defining a first logical qubit.

The four-legged cats, corresponding to the predetermined integer n equal to 1 or to 3, define a second logical qubit.

A change in parity (caused for example by a loss or a gain of a boson in the harmonic oscillator) in a logical qubit is equivalent to a change in the logical qubit. In other words, the loss or the gain of a boson in the harmonic oscillator transitions from the first logical qubit to the second logical qubit and vice versa.

The two-legged cat state is defined as the superposition of two coherent states of the quantum harmonic oscillator whose phases differ by a value of n. When a two-legged cat is decomposed on the states $|k\rangle$, the only non-zero coefficients correspond to numbers p of bosons congruent to n modulo 2, where n is a predetermined integer which can be 0 or 1.

Each value of the predetermined integer n defines a two-legged cat. Therefore, there are two two-legged cats which can be used to make a qubit, the two-legged cat state n=1 and the two-legged cat state n=0.

In this case, a logical qubit can be defined where the two-legged cat state n=0 is the logical 0 and the two-legged cat state n=1 is the logical 1. A change in parity (caused for example by a loss or a gain of a boson in the resonator) corresponds to a bit-flip of the logic qubit. In other words, the loss of a photon transitions from the two-legged cat state n=1 to the two-legged cat state n=0 and vice versa.

Parity Stabilisation Device

The parity stabilisation device comprises a nonlinear auxiliary device which is dispersively coupled to the quantum harmonic oscillator.

The auxiliary device can be in a stable level $|g\rangle$, and at least one excited level $|f\rangle$. The dispersive coupling between the harmonic oscillator and the auxiliary device means that the difference in energy or, equivalently, the difference in frequency $\omega_g(k)$ between the ground state or level $|g\rangle$ and the excited state or level |g⟩ depends linearly on the number k of bosons in the quantum harmonic oscillator.

The stabilisation device also comprises a dissipator, including at least one stable state and another excited state which spontaneously relaxes to the stable state. This spontaneous relaxation allows making, during the protocol for controlling the state of the oscillator, population displacements irreversible.

The stabilisation device also comprises an exciter configured to create two frequency combs. The frequency combs are in resonance with certain transitions of the energy levels of the system formed by the harmonic oscillator, the auxiliary device and the dissipator. They allow adding a boson in the harmonic oscillator if the integer k does not have the predetermined parity.

The frequency deviation separating two successive rays of the first frequency comb can be equal to equal to twice a second frequency deviation separating two successive rays of the second comb, as presented in application FR 2009795.

The frequency deviation separating two successive rays of the first comb of frequencies can be equal to the second frequency deviation separating two successive rays of the second comb, as presented in GERTLER Jeffrey M. et al. "Protecting a Bosonic Qubit with Autonomous Quantum Error Correction" <https://arxiv.org/abs/2004.09322>.

In the frequency domain, a frequency comb consists of rays which are regularly separated by a frequency deviation, however in the time domain this frequency comb consists of peaks separated by a time deviation which is inversely proportional to the frequency deviation. The term "ray" is used for the frequency domain and the term "peak" is used for the time domain.

This stabilisation device allows maintaining the parity of the number of bosons in the quantum harmonic oscillator in an autonomous way. No intervention by the experimenter, inside the quantum system, is necessary for stabilisation to be ensured.

Multi-Photon Dissipation Device

The control system for a state of the quantum harmonic oscillator also comprises a multi-photon dissipation device 20 arranged to remove at least one pair of bosons simultaneously from the harmonic oscillator 3.

The multi-photon dissipation device 20 allows obtaining a certain multi-photon dissipation rate which designates the inverse of the characteristic time separating the simultaneous loss of two or four (or another integer greater than one) bosons by the quantum harmonic oscillator.

As described in the article Lescanne, R., Villiers, M., Peronnin, T. et al. Exponential suppression of bit-flips in a qubit encoded in an oscillator. Nat. Phys. 16, 509-513 (2020), this dissipation of bosons in pairs has the effect of separating the qubits carrying the information in particular regions of the space of the phases, that is to say in particular zones in the representation of Wigner. The more significant this dissipation, the stronger the separation between the qubits, and the more difficult it is to switch from one qubit to another, that is to say to make a bit-flip type error.

The dissipation device can be controlled such that the importance of the dissipation phenomenon can be adjusted. In particular, the multi-photon dissipation phenomenon can be made negligible.

It is therefore possible to switch on or off the multi-photon dissipation device 20, so as to activate it only over certain activation periods.

Preparation of States of the Harmonic Oscillator

The control system 1 for the state of a quantum harmonic oscillator can be used to prepare particular states of the oscillator, and in particular the two-legged Schrödinger's cat type state.

A change in parity (caused for example by a loss or a gain of a boson in the harmonic oscillator) of the two-legged cat induces a change in the state of the logical qubit. The two-legged cat state n=1 becomes the two-legged cat state n=0 and vice versa.

By using the parity stabilisation device, it is possible to choose to maintain even parity. In this case, the loss of a boson, for example a photon, will bring the two-legged cat state n=1 into the two-legged cat state n=0 while the two-legged cat state n=0 will not lead to a change in parity. Naively it is then possible to expect that any state converges towards the two-legged cat state n=0 in a deterministic manner, which allows preparing this state.

However, the protocol for maintaining the parity also has the effect of affecting the relative phases between the superpositions of the different Fock states "k" of the quantum harmonic oscillator. Thus, the parity maintenance protocol allows preparing, in a deterministic manner, a state having a certain parity, but this state is not a two-legged cat state, even if the initial state would be one.

In order to overcome this problem, the inventors propose to set up a two-photon simultaneous dissipation process. Among the set of possible states of the quantum harmonic oscillator having the even parity, this two-photon dissipation allows stabilising the two-legged cat state n=0. In the same manner, among the set of possible states of the quantum harmonic oscillator having the odd parity, this two-photon dissipation allows stabilising the two-legged cat state n=1.

With the parity maintenance protocol and the two-photon dissipation operating simultaneously, it is thus possible to deterministically prepare the two-legged cat state n=0 or the two-legged cat state n=1, regardless of the initial state of the quantum harmonic oscillator.

Time Alternation of Activation Periods and Frequency Comb Peaks

According to the invention, the multi-photon dissipation device and the parity stabilisation device are time-controlled such that the activation periods of the dissipation device do not overlap any time peak of the first frequency comb or of the second frequency comb.

The activation periods are adjusted such that a localisation of the state in a modified Wigner representation during the activation periods of the stabilisation device is restored by the dissipation device.

In the Wigner representation of a four-legged cat state, the four coherent states of the quantum harmonic oscillator, whose superposition defines the four-legged cat state, are localised around the phases 0°, 90°, 180° and 270°.

When the multi-photon dissipation is inactive, there is a phase drift of the state of the oscillator.

When the multi-photon dissipation is active, the state of the harmonic oscillator is attracted and returned to that of the four coherent states whose phase is the closest.

The result that the localisation of the state in a modified Wigner representation during the activation periods of the stabilisation device is restored by the dissipation device, can for example be obtained when:

(a) each frequency comb includes at least as many rays as the mean number of bosons corresponding to the size of the cat,
(b) the duration during which the multi-photon dissipation is inactive is less than the characteristic time separating two successive bit-flip type errors, and (c) the duration during which the multi-photon dissipation is active is greater than the inverse of the product of the mean number of bosons corresponding to the size of the cat and the multi-photon dissipation rate.

The first two features (a) and (b) allow the phase drift of the state, while the multi-photon dissipation is inactive, to be less than 45°.

The third feature (c) allows the multi-photon dissipation to be active long enough in order to reduce this phase drift.

If one of the features is absent, then the "bit-flip" or "phase-flip" type error rate increases, that is to say the characteristic time separating two successive "bit-flip" or "phase-flip" type errors decreases. All this is set before the implementation of the protocol for controlling the state of the quantum harmonic oscillator.

In Wigner representation of a two-legged cat state, the two coherent states of the quantum harmonic oscillator, whose superposition defines the two-legged cat state, are localised around the phases 0° and 180°.

When the multi-photon dissipation is inactive, there is a phase drift of the state of the oscillator.

When the multi-photon dissipation is active, the state of the harmonic oscillator is attracted and returned to that of the two coherent states whose phase is the closest.

The result according to which the localisation of the state in a modified Wigner representation during the activation periods of the stabilisation device is restored by the dissipation device, can for example be obtained when:

(a) each frequency comb includes at least as many rays as the mean number of bosons corresponding to the size of the cat, (b) the duration during which the multi-photon dissipation is inactive is less than the characteristic loss time of a boson, and (c) the duration during which the multi-photon dissipation is active is greater than the inverse of the product of the mean number of bosons corresponding to the size of the cat and the multi-photon dissipation rate.

The first two features (a) and (b) allow the phase drift of the state, while the multi-photon dissipation is inactive, to be less than 90°.

The third feature (c) allows the multi-photon dissipation to be active long enough to reduce this phase drift.

The characteristic loss time of a boson is the average typical time separating two successive losses of a boson in the harmonic oscillator in the absence of any correction method.

If one of the features is absent, then the rate the probability that the parity has the predetermined value decreases and the superposition between the Fock states "k" is no longer the good one. This leads to a reduction in the purity of the prepared state.

All this is set before the implementation of the protocol for controlling the state of the quantum harmonic oscillator.

The time alternation between the multi-photon dissipation device and the parity stabilisation device is interesting for combining the corrective effects of the two methods to resist the bit-flip type and phase-flip type errors, or else to prepare a state of given parity.

A priori, these two methods appeared difficult to use together, because the dispersive coupling can, in certain cases, cause bit-flip type errors and its action is therefore prevented by the multi-photon dissipation device. The fact that dissipation is disabled when a comb peak associated with the parity maintenance is sent allows that multi-photon dissipation and parity maintenance are never simultaneously activated. The action of one is therefore not prevented by the action of the other.

Moreover, the activation periods of the multi-photon dissipation are adjusted so that a localisation of the state in a Wigner representation deteriorated by the parity stabilisation step can be restored during the multi-photon dissipation step. In this manner, the adverse effects of multi-photon dissipation and parity stabilisation can be balanced.

High Time Pulse Frequency Combs

The longer the multi-photon dissipation is inactive, the greater the probability of an irreparable error. An error is irreparable by the multi-photon dissipation in particular when it produces an oscillator state phase drift which is greater than 45° or 90° while the multi-photon dissipation is inactive.

In order to limit the occurrence of irreparable errors, the first frequency deviation and the second frequency deviation are chosen as significant as possible. Indeed, the greater these deviations, the shorter and closer to each other are the time peaks of the frequency combs, in other words the more significant the pulse of the time peaks.

By imposing a higher pulse of time peaks, the activation periods of the multi-photon dissipation device can then be longer and closer to each other. In this situation the multi-photon dissipation is more often active, and the duration during which an irreparable error can occur is thus reduced.

The first frequency deviation and the second frequency deviation are therefore chosen greater than the rate of occurrence of the errors of the "loss of a boson" type, that is to say the inverse of the characteristic loss time of a boson in the harmonic oscillator.

Time Offset Between the Frequency Combs

It is possible to configure the exciter such that it generates the first and second frequency combs with the peaks of the first comb which are time offset relative to the peaks of the second comb.

The time offset can be characterised by the duration D separating a peak of the first frequency comb and the first peak of the second frequency comb which temporally follows the negative peak.

In the case where the first frequency deviation is equal to twice the second frequency deviation, choices of the time offset D have been specified in application FR 2009795. These choices allow reducing an alteration channel whose effect is to add a boson in the oscillator when this is undesirable.

In the case where the first frequency deviation is equal to the second frequency deviation, this frequency deviation is denoted $\chi$. It is possible to configure the exciter so that it generates the first and second frequency combs with the peaks of the first comb which are time offset relative to the peaks of the second comb.

The time offset can be characterised by the duration D separating a peak of the first frequency comb and the first peak of the second frequency comb which temporally follows this peak of the first comb.

The time offset D can be chosen freely in the interval $$\left[0; \frac{2\pi}{\chi}\right].$$

The time offset D can advantageously be chosen in the interval $$\left[\frac{\delta_1 + \delta_2}{2}; \frac{\pi}{X} - \frac{\delta_1 + \delta_2}{2}\right]$$

or the interval $$\left[\frac{\pi}{X} + \frac{\delta_1 + \delta_2}{2}; \frac{2\pi}{X} - \frac{\delta_1 + \delta_2}{2}\right]$$

where $\delta_1$ and $\delta_2$ designate respectively the width at midheight of the peaks of the first comb and of the second comb.

Mean Number of Bosons

As previously mentioned, the first and second frequency combs each include at least as many rays as the mean number of bosons corresponding to the size of the cat.

It is possible to use frequency combs which include more rays, in particular to reduce the error rate.

The lower the desired error rate, the more frequency combs including a large number of rays should be used.

Superconducting Circuit Technology

Figure 2:
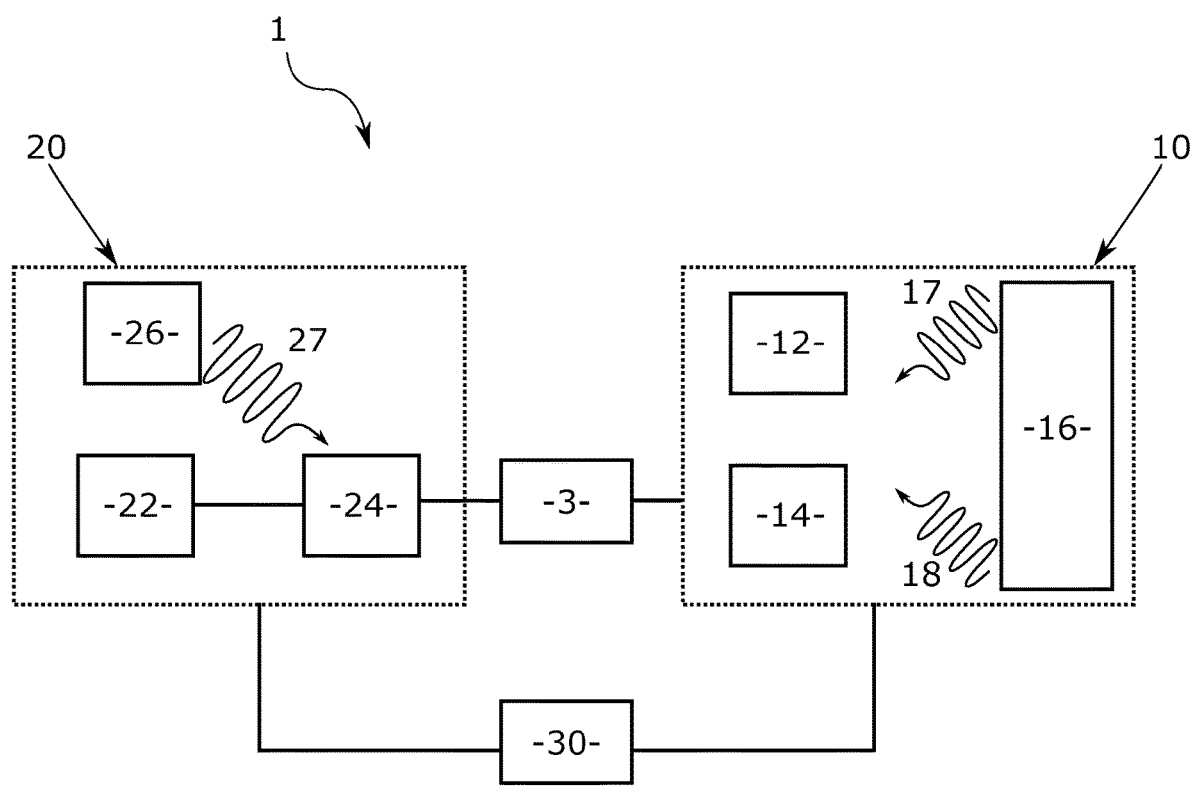

The method for controlling the state of the quantum harmonic oscillator described here can, for example, be carried out using superconducting circuit technology, as schematically represented in FIG. 2.

The quantum harmonic oscillator 3 can then be a superconducting microwave resonator.

The parity stabilisation device 10 comprises an auxiliary system which can be a transmon 14, and the dissipator can be another superconducting microwave resonator 12 having, compared to the oscillator 3, a bad quality factor. The parity stabilisation device also comprises an exciter 16 arranged to generate the frequency combs 17 and 18.

Application FR 2009795 describes different embodiments, corresponding to a particular pair of excited state |f⟩ of the transmon and integer p (equal to a number of bosons exchanged in the transitions excited by the frequency combs), of the stabilisation device using the superconductor technology. These embodiments are directly compatible with the method for controlling a state of the quantum oscillator presented here.

The multi-photon dissipation device 20 can be produced according to the indications of the article Lescanne, R., Villiers, M., Peronnin, T. et al. Exponential suppression of bit-flips in a qubit encoded in an oscillator. Nat. Phys. 16, 509-513 (2020).

In particular, the multi-photon dissipation device 20 can comprise a dissipator 22. This dissipator 22 may for example be a superconducting microwave resonator having, compared to the oscillator, a poor quality factor.

The multi-photon dissipation device can also comprise an ATS circuit 24, the term ATS meaning Asymmetrically Threaded SQUID, that is to say a SQUID (for Superconducting Quantum Interference Device) which is asymmetrically wound. The ATS circuit 24 ensures the coupling of the harmonic oscillator 3 with the dissipator 22.

The multi-photon dissipation device 20 comprises a pump source 26 of the ATS circuit. The pump source 26 can be controlled to send a pump energy 27 to the ATS circuit 24. When it receives the pump energy 27, the ATS circuit 24 couples the dissipator 22 and the oscillator 3 and the multi-photon dissipation has place. When it does not receive the pump energy 27, the ATS circuit 24 does not couple the dissipator 22 and the oscillator 3 and the multi-photon dissipation does not take place. The control of the pump source thus allows defining the activation periods of the multi-photon dissipation.

The multi-photon dissipation device 20 comprises a dissipator excitation source 22. This excitation source allows adjusting the mean number of bosons in the harmonic oscillator 3, that is to say the size of the cat when the harmonic oscillator is in a Schrödinger's cat type state. The dissipator excitation source 22 can be synchronised with the pump source 26, that is to say both sources are active and inactive at the same time. Thus, the excitation source does not send energy into the dissipator, when the pump source is inactive.

The control system for the state of the quantum harmonic oscillator can finally comprise a controller 30 which controls the parity stabilisation device 10 and the multi-photon dissipation device 20. In particular the controller 30 can ensure the synchronisation of the generation of the frequency combs 17, 18 by exciter 16 and the generation of the pump energy 27 by the pump source 26.

The controller 30 can in particular guarantee that the multi-photon dissipation device is activated only over activation periods between two successive time peaks of the first and second frequency combs.

Finally, the invention relates to a method for controlling a state of a quantum harmonic oscillator comprising the following simultaneous steps:
- stabilisation of a predetermined parity of a number of bosons of a Schrödinger's cat type state of the oscillator, the stabilisation comprising a generation of the first and second frequency combs, and
- multi-photon dissipation so as to remove at least one pair of bosons simultaneously from the oscillator,
- the multi-photon dissipation being activated only over activation periods between two successive time peaks of the first and second frequency combs,
- the activation periods being adjusted such that a localisation of the state in a modified Wigner representation during the activation periods of the parity stabilisation is restored by the multi-photon dissipation.

The invention claimed is:

1. A control system for a state of a quantum harmonic oscillator, comprising:
   the quantum harmonic oscillator configured to carry encoded information in a Schrödinger's cat type state of the quantum harmonic oscillator,
   a stabilization device for a predetermined parity of a number of bosons of the Schrödinger's cat type state, which device is configured to use a first frequency comb and a second frequency comb, the first frequency comb and the second frequency comb each including at least as many rays as a mean number of bosons in the Schrödinger's cat type state of the quantum harmonic oscillator, and
   a multi-photon dissipation device arranged to remove at least one pair of bosons simultaneously from the quantum harmonic oscillator,
      the multi-photon dissipation device being arranged such that it is activated only over activation periods between two successive time peaks of the first frequency comb and the second frequency comb,
      the activation periods each having a duration which is greater than an inverse of a product of a mean number of bosons in the Schrödinger's cat type state of the quantum harmonic oscillator and an inverse of a characteristic time separating a removal of at least one pair of bosons simultaneously from the quantum harmonic oscillator by multi-photon dissipation, and a duration separating two successive activation periods being less than a characteristic loss time of a boson in the quantum harmonic oscillator.

2. The control system according to claim 1, wherein the activation periods are adjusted such that a localization of the Schrödinger's cat type state in a Wigner representation modified during the activation periods of the stabilization device is restored by the multi-photon dissipation device.

3. The control system according to claim 1, wherein a first frequency deviation separating two successive rays of the first frequency comb and a second frequency deviation separating two successive rays of the second frequency comb are greater than the inverse of the characteristic loss time of a boson in the quantum harmonic oscillator.

4. The control system according to claim 1, wherein a first frequency deviation separating two successive rays of the first frequency comb is equal to twice a second frequency deviation separating two successive rays of the second frequency comb.

5. The control system according to claim 1, wherein the first frequency comb and the second frequency comb have peaks in a time domain, the peaks of the first frequency comb being time-shifted relative to the peaks of the second frequency comb.

6. The control system according to claim 1, wherein the quantum harmonic oscillator is a first superconducting microwave resonator, the stabilization device comprising:

a transmon, a second superconducting microwave resonator having a quality factor which is lower than a quality factor of the first superconducting microwave resonator, and an exciter arranged to emit the first and second frequency combs, the multi-photon dissipation device comprising:

a dissipator such as a third superconducting microwave resonator having a quality factor which is lower than a quality factor of the first superconducting microwave resonator, a pump source and a coupling circuit arranged to couple the dissipator and the quantum harmonic oscillator, the dissipation device being able to be activated when the coupling circuit receives a pump energy from the pump source.

7. A method for controlling a state of a quantum harmonic oscillator, the method comprising:

stabilizing a predetermined parity of a number of bosons of a Schrödinger's cat type state of the quantum harmonic oscillator, the stabilization comprising generating a first frequency comb and a second frequency comb, the first frequency comb and the second frequency comb each including at least as many rays as a mean number of bosons in the Schrödinger's cat type state of the quantum harmonic oscillator, and wherein multi-photon dissipation removes at least one pair of bosons simultaneously from the quantum harmonic oscillator, the multi-photon dissipation is activated only over activation periods between two successive time peaks of the first frequency comb and the second frequency comb, the activation periods each have a duration which is greater than an inverse of a product of a mean number of bosons in a Schrödinger's cat type state of the quantum harmonic oscillator and an inverse of a characteristic time separating the removal of at least one pair of bosons simultaneously from the quantum harmonic oscillator by multi-photon dissipation, and a duration separating two successive activation periods is less than a characteristic loss time of a boson in the quantum harmonic oscillator.

\* \* \* \* \*